US012572340B2

(12) United States Patent
Wang et al.

(10) Patent No.: US 12,572,340 B2
(45) Date of Patent: Mar. 10, 2026

(54) CONTROLLING APPLICATION LOGGING

(71) Applicant: INTERNATIONAL BUSINESS MACHINES CORPORATION, Armonk, NY (US)

(72) Inventors: Jin Wang, Xi'an (CN); Lei Gao, Xi'an (CN); A Peng Zhang, Xi'an (CN); Kai Li, Xi'an (CN); Jia Xing Tang, Xi'an (CN); Xin Feng Zhu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 18/478,150

(22) Filed: Sep. 29, 2023

(65) Prior Publication Data

US 2025/0110716 A1 Apr. 3, 2025

(51) Int. Cl.
*G06F 8/41* (2018.01)
*G06F 16/22* (2019.01)

(52) U.S. Cl.
CPC .......... *G06F 8/433* (2013.01); *G06F 16/2246* (2019.01)

(58) Field of Classification Search
CPC .............................. G06F 8/433; G06F 16/2246
USPC ......................................................... 717/144
See application file for complete search history.

(56) References Cited

U.S. PATENT DOCUMENTS

| | | | | | |
|---|---|---|---|---|---|
| 5,895,472 A | * | 4/1999 | Brodsky | .................. | G06F 9/542 |
| | | | | | 707/999.203 |
| 5,936,860 A | * | 8/1999 | Arnold | ...................... | G06F 8/24 |
| | | | | | 709/200 |
| 7,877,607 B2 | * | 1/2011 | Circenis | .................. | G06F 21/10 |
| | | | | | 713/170 |
| 9,459,990 B2 | * | 10/2016 | Ligman | ............... | G06F 11/3644 |
| 9,807,154 B2 | * | 10/2017 | Darling | ................. | H04L 67/535 |
| 12,229,226 B2 | * | 2/2025 | Valdes | ..................... | G06N 5/01 |
| 2006/0242207 A1 | * | 10/2006 | Tsyganskiy | ............... | G06F 8/72 |
| | | | | | 707/999.203 |
| 2015/0378724 A1 | * | 12/2015 | Balachandran | ..... | G06F 11/3636 |
| | | | | | 717/123 |
| 2017/0235570 A1 | * | 8/2017 | Catalano | ............... | H04L 47/803 |
| | | | | | 717/101 |

(Continued)

OTHER PUBLICATIONS

Barth, Paul S. "An object-oriented approach to graphical interfaces." ACM Transactions on Graphics (TOG) 5.2 (1986): pp. 142-172. (Year: 1986).*

(Continued)

*Primary Examiner* — Satish Rampuria
(74) *Attorney, Agent, or Firm* — Onyx IP Group

(57) ABSTRACT

Controlling application logging, including: identifying one or more relationships between a plurality of classes of an object oriented application; generating a tree structure comprised of a plurality of nodes and a plurality of branches, where each of the plurality of branches is comprised of at least one node from the plurality of nodes, based on the one or more identified relationships, where a first one or more nodes of the plurality of nodes correspond to one or more classes of the object-oriented application; assigning a weight to each of the plurality of branches, based at least in part on an identified relationship corresponding to each of the one or more nodes comprising each of the plurality of branches; and determining a logging level to each branch of the plurality of branches, based on the assigned weight for each branch of the plurality of branches.

20 Claims, 7 Drawing Sheets

(56)         References Cited

U.S. PATENT DOCUMENTS

| | | |
|---|---|---|
| 2018/0137028 A1 | 5/2018 | Mochizuki et al. |
| 2020/0159652 A1 | 5/2020 | Sharma et al. |
| 2020/0192778 A1 | 6/2020 | Gao et al. |

OTHER PUBLICATIONS

Lieberherr, Karl J., Paul Bergstein, and Ignacio Silva-Lepe. "From objects to classes: Algorithms for optimal object-oriented design." Software Engineering Journal 6.4 (1991): pp. 205-228. (Year: 1991).*

Xing, Zhenchang, and Eleni Stroulia. "UMLDiff: an algorithm for object-oriented design differencing." Proceedings of the 20th IEEE/ACM international Conference on Automated software engineering. 2005. pp. 54-65 (Year: 2005).*

Fayad, Mohamed, and Douglas C. Schmidt. "Object-oriented application frameworks." Communications of the ACM 40.10 (1997): pp. 32-38. (Year: 1997).*

Arzt, Steven, et al. "Flowdroid: Precise context, flow, field, object-sensitive and lifecycle-aware taint analysis for android apps." ACM sigplan notices 49.6 (2014): pp. 259-269. (Year: 2014).*

Briand, Lionel C., John W. Daly, and Jurgen K. Wust. "A unified framework for coupling measurement in object-oriented systems." IEEE Transactions on software Engineering 25.1 (2002): pp. 91-121. (Year: 2002).*

Anonymous, "System and Method to Automatically Recommend Logging Using Crowdsource Data and NLP for Code," An IP.com Prior Art Database Technical Disclosure, IP.com No. IPCOM000266656D, IP.com Electronic Publication Date: Aug. 5, 2021, 7 pages.

* cited by examiner

100

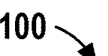

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122    LOGGING CONFIGURATION CODE 200

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

FIG. 1

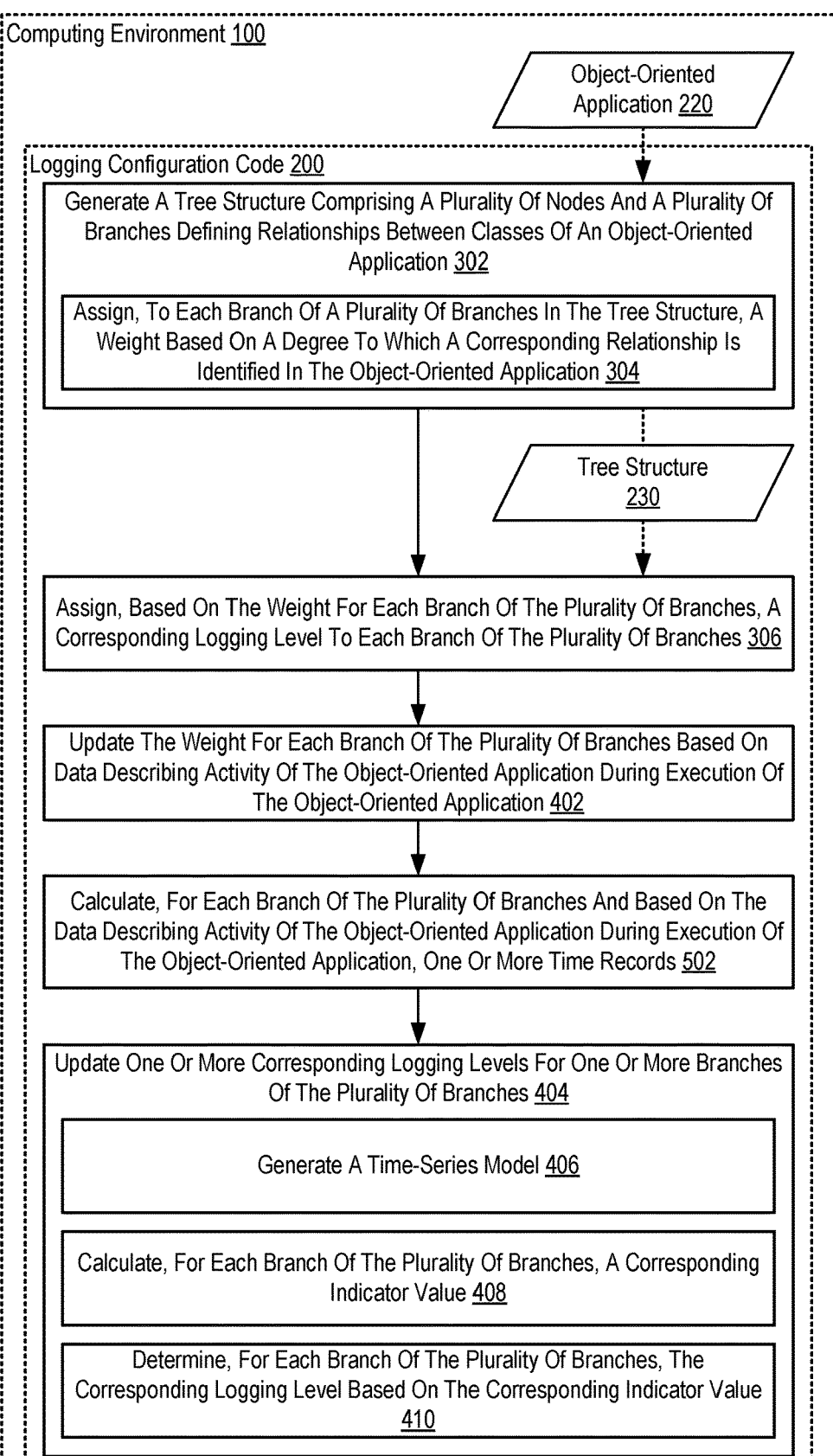

Computing Environment 100

Object-Oriented Application 220

Logging Configuration Code 200

Generate A Tree Structure Comprising A Plurality Of Nodes And A Plurality Of Branches Defining Relationships Between Classes Of An Object-Oriented Application 302

Assign, To Each Branch Of A Plurality Of Branches In The Tree Structure, A Weight Based On A Degree To Which A Corresponding Relationship Is Identified In The Object-Oriented Application 304

Tree Structure 230

Assign, Based On The Weight For Each Branch Of The Plurality Of Branches, A Corresponding Logging Level To Each Branch Of The Plurality Of Branches 306

Update The Weight For Each Branch Of The Plurality Of Branches Based On Data Describing Activity Of The Object-Oriented Application During Execution Of The Object-Oriented Application 402

Calculate, For Each Branch Of The Plurality Of Branches And Based On The Data Describing Activity Of The Object-Oriented Application During Execution Of The Object-Oriented Application, One Or More Time Records 502

Update One Or More Corresponding Logging Levels For One Or More Branches Of The Plurality Of Branches 404

Generate A Time-Series Model 406

Calculate, For Each Branch Of The Plurality Of Branches, A Corresponding Indicator Value 408

Determine, For Each Branch Of The Plurality Of Branches, The Corresponding Logging Level Based On The Corresponding Indicator Value 410

FIG. 5

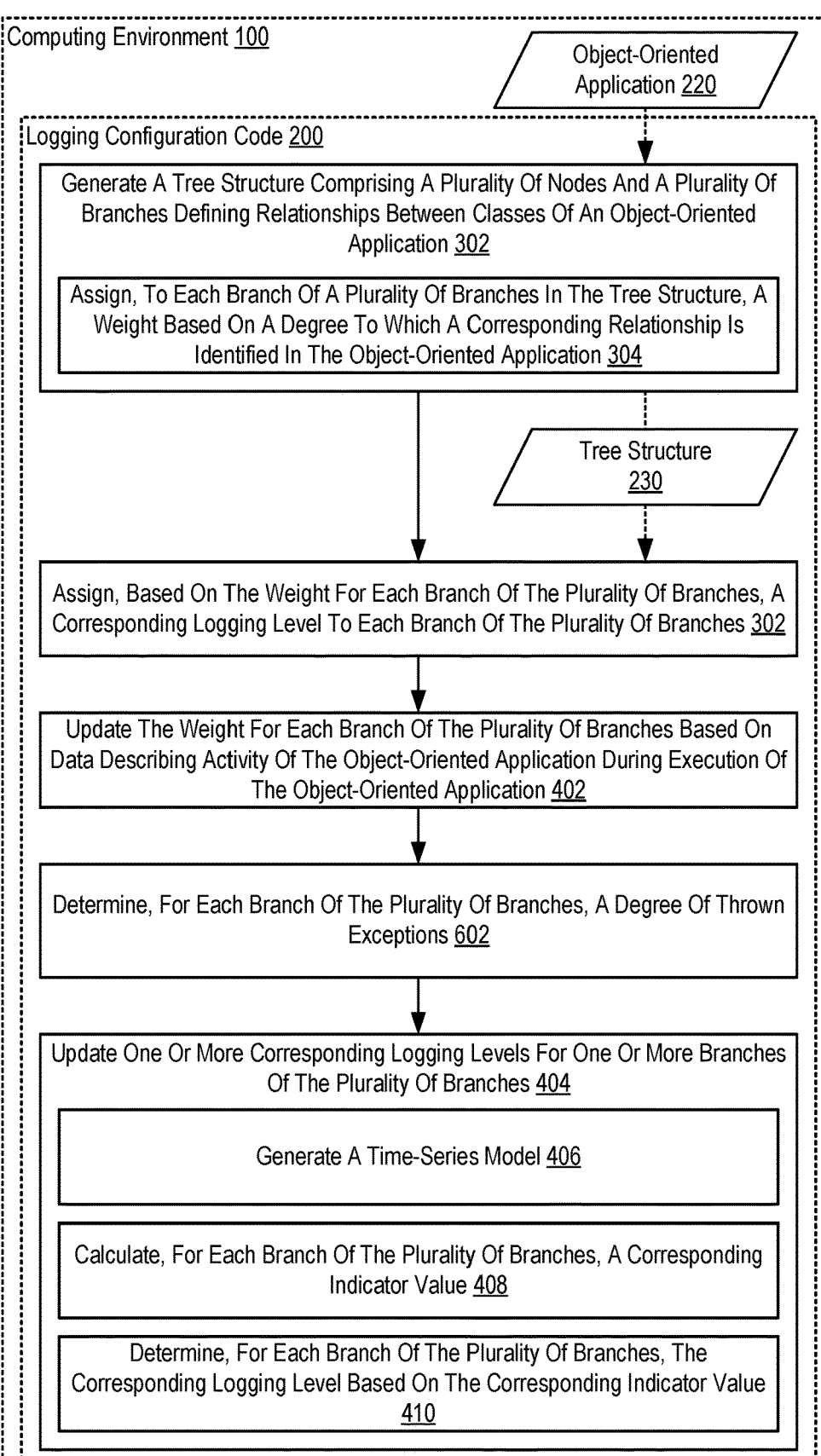

Computing Environment 100

Object-Oriented Application 220

Logging Configuration Code 200

Generate A Tree Structure Comprising A Plurality Of Nodes And A Plurality Of Branches Defining Relationships Between Classes Of An Object-Oriented Application 302

Assign, To Each Branch Of A Plurality Of Branches In The Tree Structure, A Weight Based On A Degree To Which A Corresponding Relationship Is Identified In The Object-Oriented Application 304

Tree Structure 230

Assign, Based On The Weight For Each Branch Of The Plurality Of Branches, A Corresponding Logging Level To Each Branch Of The Plurality Of Branches 302

Update The Weight For Each Branch Of The Plurality Of Branches Based On Data Describing Activity Of The Object-Oriented Application During Execution Of The Object-Oriented Application 402

Determine, For Each Branch Of The Plurality Of Branches, A Degree Of Thrown Exceptions 602

Update One Or More Corresponding Logging Levels For One Or More Branches Of The Plurality Of Branches 404

Generate A Time-Series Model 406

Calculate, For Each Branch Of The Plurality Of Branches, A Corresponding Indicator Value 408

Determine, For Each Branch Of The Plurality Of Branches, The Corresponding Logging Level Based On The Corresponding Indicator Value 410

FIG. 6

CONTROLLING APPLICATION LOGGING

BACKGROUND

The field of the invention is data processing, or, more specifically controlling application logging.

SUMMARY

According to embodiments of the present disclosure, various methods, apparatus, and products for controlling application logging are described herein. In some aspects, a computer-implemented method of controlling application logging includes identifying, by a processor, one or more relationships between a plurality of classes of an object oriented application. The method also includes generating, by the processor, a tree structure comprised of a plurality of nodes and a plurality of branches, where each of the plurality of branches is comprised of at least one node from the plurality of nodes. The generation of the tree structure is based on the one or more identified relationships, where a first one or more nodes of the plurality of nodes correspond to one or more classes of the object-oriented application. The method also includes assigning, by the processor, a weight to each of the plurality of branches, based at least in part on an identified relationship corresponding to each of the one or more nodes comprising each of the plurality of branches. The method also includes determining, by the processor, a logging level to each branch of the plurality of branches, based on the assigned weight for each branch of the plurality of branches. This allows for variable logging levels for different branches in an object-oriented application based on a degree to which those branches are present in a tree structure representing the relationship between classes of the object-oriented application.

In some embodiments, the computer-implemented method may further include: monitoring, by the processor, execution of the object-oriented application; updating, based on the monitoring, the weight for each branch of the plurality of branches; and updating, by the processor, based on one or more updated weights, one or more corresponding logging levels for one or more branches of the plurality of branches. This allows for the logging levels for different branches to be updated based on the usage patterns of particular users.

In some embodiments, updating the one or more corresponding logging levels comprises generating, by the processor, a time-series model comprising one or more predictive weights for each branch of the plurality of branches. This allows for the logging levels for different branches to be updated based on a predictive analysis of user behavior.

In some embodiments, a computer system for controlling application logging may include: one or more processors; a memory storage device in communication with the one or more processors, and computer program instructions executable by the one or more processors to perform operations, the operations comprising: identifying, by the one or more processors, one or more relationships between a plurality of classes of an object oriented application; generating, by the one or more processors, a tree structure comprised of a plurality of nodes and a plurality of branches, where each of the plurality of branches is comprised of at least one node from the plurality of nodes, based on the one or more identified relationships, where a first one or more nodes of the plurality of nodes correspond to one or more classes of the object-oriented application; assigning, by the one or more processors, a weight to each of the plurality of branches, based at least in part on an identified relationship corresponding to each of the one or more nodes comprising each of the plurality of branches; and determining, by the one or more processors, a logging level to each branch of the plurality of branches, based on the assigned weight for each branch of the plurality of branches. This allows for variable logging levels for different branches in an object-oriented application based on a degree to which those branches are present in a tree structure representing the relationship between classes of the object-oriented application.

In some embodiments, the operations may further comprise: monitoring, by the one or more processors, execution of the object-oriented application; updating, by the one or more processors, based on the monitoring, the weight for each branch of the plurality of branches; and updating, by the one or more processors, based on one or more updated weights, one or more corresponding logging levels for one or more branches of the plurality of branches. This allows for the logging levels for different branches to be updated based on the usage patterns of particular users.

In some embodiments, updating the one or more corresponding logging levels comprises generating a time-series model comprising one or more predictive weights for each branch of the plurality of branches. This allows for the logging levels for different branches to be updated based on a predictive analysis of user behavior.

In some embodiments, a computer program product for controlling application logging may include: a computer readable storage device, program instructions stored on the computer readable storage device, the program instructions executable by a processor to cause said processor to perform a function, said function comprising: identifying, by the processor, one or more relationships between a plurality of classes of an object oriented application; generating, by the processor, a tree structure comprised of a plurality of nodes and a plurality of branches, where each of the plurality of branches is comprised of at least one node from the plurality of nodes, based on the one or more identified relationships, where a first one or more nodes of the plurality of nodes correspond to one or more classes of the object-oriented application; assigning, by the processor, a weight to each of the plurality of branches, based at least in part on an identified relationship corresponding to each of the one or more nodes comprising each of the plurality of branches; and determining, by the processor, a logging level to each branch of the plurality of branches, based on the assigned weight for each branch of the plurality of branches. This allows for variable logging levels for different branches in an object-oriented application based on a degree to which those branches are present in a tree structure representing the relationship between classes of the object-oriented application.

BRIEF DESCRIPTION OF THE DRAWINGS

FIG. 1 shows a block diagram of an example computing environment for controlling application logging according to some embodiments of the present disclosure.

FIG. 5 shows a flowchart of another example method for controlling application logging according to some embodiments of the present disclosure.

FIG. 6 shows a flowchart of another example method for controlling application logging according to some embodiments of the present disclosure.

DETAILED DESCRIPTION

Figure 2:
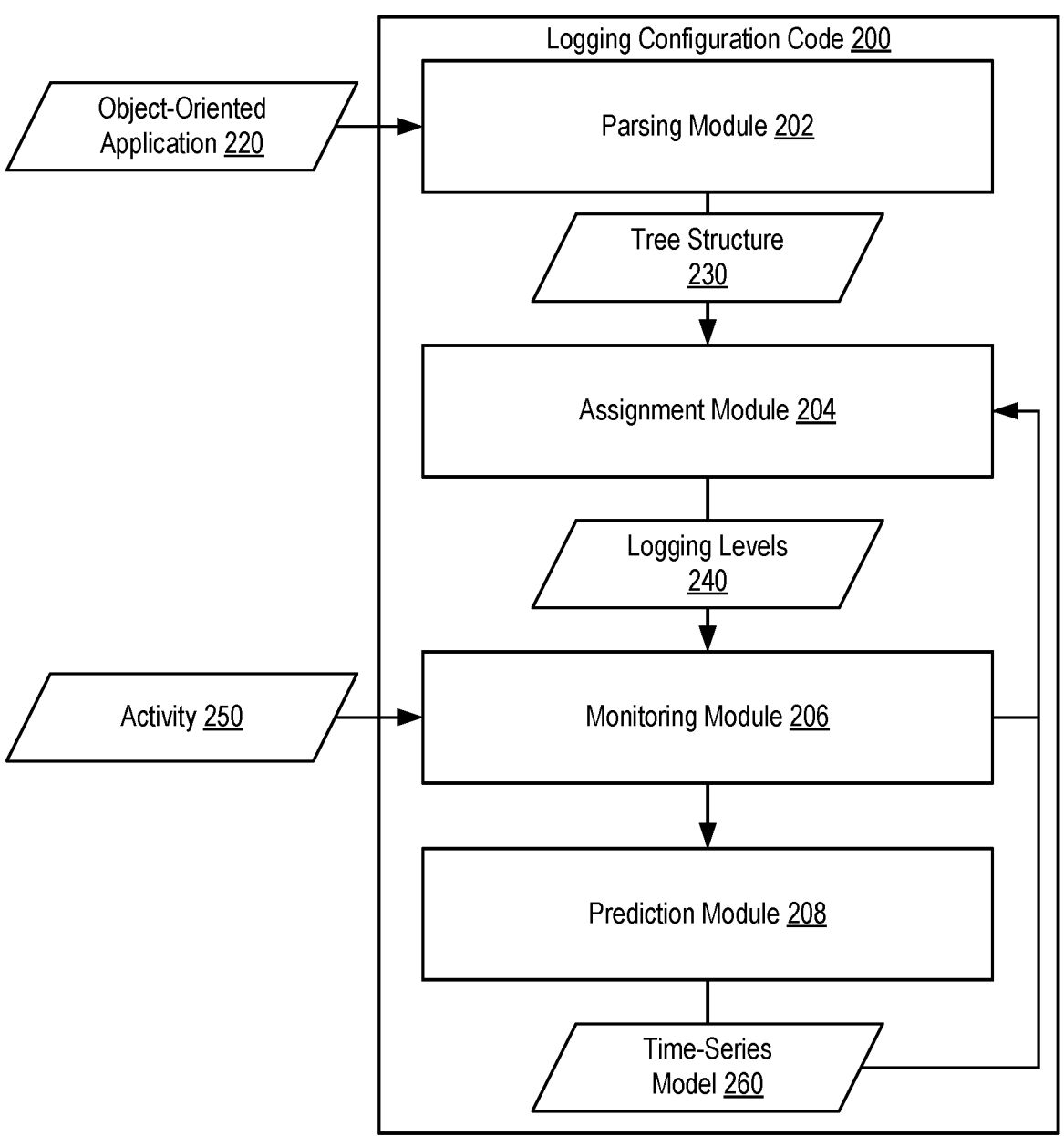
FIG. 2 shows a structure block diagram for controlling application logging according to some embodiments of the present disclosure.

As applications execute in different production environments, various issues may arise. An engineer attempting to address these issues may depend on log data generated during execution of the application, particularly where the issue may be difficult to reproduce. Though more detailed log data may be beneficial in diagnosing application issues, producing logs in greater detail results in increased computational resource utilization, thereby downgrading performance. Conversely, producing less detailed log data may result in performance advantages while being less helpful in diagnosing application issues. Existing approaches for defining the level of specificity or detail for log data requires the parameters and criteria to be defined in advance, which may not be adequate to address issues that arise during execution of the application in a production environment.

To address these concerns, the approaches set forth herein describe approaches for dynamically determining logging levels for an application. Particularly, the approaches set forth herein provide for varying degrees of logging detail or specificity depending on the particular execution paths of the application. Moreover, the approaches set forth herein provide for the ability to update these logging levels depending on the behaviors and activity of a user of the application.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as logging configuration code 200. In addition to logging configuration code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and logging configuration code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in logging configuration code 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in logging configuration code 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Controlling application logging as described herein may be performed by the logging configuration code 200 with respect to an object-oriented application 220 as shown in the structure block diagram of FIG. 2. An object-oriented application 220 is an application coded according to object-oriented design principles and may be coded using languages designed or optimized for object-oriented applications including Java, C++, and the like. To begin, a parsing module 202 of the logging configuration code 200 may accept, as input, an object-oriented application 220. The parsing module 202 parses the object-oriented application 220 to generate a tree structure 230 defining relationships between classes of the object-oriented application 220. Parsing the object-oriented application 220 may include parsing a non-executable representation of the object-oriented application 220, such as source code of the object-oriented application 220. An object-oriented application 220 includes multiple defined classes. Each class may include one or more attributes such that each instance of the class (e.g., each object) may have values defined for each of these attributes. Each class may also include one or more methods defined by one or more method definition. A method definition defines what parameters may be input to the method as well as the functional steps of the method itself.

The tree structure 230 may include multiple nodes. In some embodiments, one or more of the nodes may correspond to a class of the object-oriented application 220. In some embodiments, one or more of the nodes may correspond to a particular attribute of a particular class of the application. By parsing the object-oriented application 220 to generate the tree structure 230, a branch (e.g., a link between nodes) may be created in the tree structure 230 based on a method of a particular class including a method that accepts, as a parameter, an attribute of a particular class (e.g., of the same particular class, of a different class).

As an example, assume classes A, B, and C each with attributes A-a1, B-a1, and C-a1, respectively. Further assume that class A includes a method A-M1(C-a1, B-a1), whereby the method A-M1 accepts, as input parameters, attribute C-a1 from class C and attribute B-a1 from class B. In some embodiments, generating the tree structure 230 may include generating branches that link a node for a class having a given method to nodes for classes having the attribute parameters for that method. Continuing with the example above, a first branch may be created from a node corresponding to class A to a node corresponding to class C (due to the method in class A accepting, as a parameter, an attribute of class C) and a second branch may be created from a node corresponding to class A to a node corresponding to class B (due to the method in class A accepting, as a parameter, an attribute of class B).

As another example, in some embodiments, generating the tree structure 230 may include generating branches that link a node for a class having a given method to nodes for the attributes of the parameters for that method. Returning to the example above, a first branch may be created from a node corresponding to class A to a node corresponding to attribute C-a1 and a second branch may be created from a node corresponding to class A to a node corresponding to attribute B-a1. In some embodiments, generating the tree structure 230 may also be performed according to similar approaches above with nodes corresponding to particular methods, or with other degrees of granularity as can be appreciated.

A newly added branch to the tree structure 230 may be assigned a particular weight by the parsing module 202, to be described in further detail below. The weight of each branch in the tree structure 230 may be based on the degree to which a corresponding relationship is identified in the object-oriented application 220. Thus, execution paths with higher degrees of occurrence may be assigned a higher weight compared to execution paths with lower degrees of occurrence. While parsing the object-orient application 220, multiple instances of the same branch (e.g., a same relationship) may be identified. Continuing with the example method A-M1(C-a1, B-a1) above, further assume that class A also includes a method A-M2(C-a1, D-a1), with D-a1 being an attribute of another class D. Assuming that application A-M1 has already been parsed and its branches added to the tree structure 230, parsing A-M2 may identify branches from class A to attributes C-a1 and D-a1. This may cause a newly added branch to be added between a node for class A and a node for attribute D-a1. As a branch already exists between class A and attribute C-a1, the weight for that branch may be updated in response to identifying another relationship or execution path between nodes already included in the tree structure 230.

After generating the tree structure 230, each branch may have a corresponding assigned weight. In some embodiments, an assignment module 204 may assign a logging level 240 to each branch based on the corresponding weight in the tree structure 230. A logging level 240 defines an amount of detail or information to be included in a log message generated in response to an execution path performed along that branch. For example, for the lowest logging level 240, an error may only cause log data to be generated indicating that some error occurred. The next-highest logging level 240 may cause log data to be generated specifying the type of error that occurred and/or an indication of where, in the code, such an error occurred. The highest logging level 240 may cause log data to be generated with additional detail, such as stack traces, runtime information, and the like. In some embodiments, particular logging levels 240 may print information related to particular classes, such as method attribute keywords and the like.

As an example, a logging level 240 for a branch linking a first node corresponding to a first class to a second node corresponding to a second class may define how log information is generated for any method of the first class that accepts, as a parameter, an attribute from the second class. As another example, a logging level 240 for a branch linking a first node corresponding to a first class to a second node corresponding to an attribute of a second class may define how log information is generated for any method of the first class that accepts, as a parameter, the attribute from the second class.

In some embodiments, the logging levels 240 for the various branches of the object-oriented application 220 may be encoded by the assignment module 204 in a configuration file or other data accessed during execution of the object-oriented application 220 such that log data may be generated according to these logging levels 240 during execution. In some embodiments, the logging levels 240 for the various branches of the object-oriented application 220 may be encoded by the assignment module 204 in the source code of the object-oriented application 220 itself such that, once compiled, the object-oriented application 220 will be generated according to these logging levels 240.

The approaches set forth above provide for variable logging levels 240 to be determined for particular execution paths in an object-oriented application 220 based on the relationships between the classes of the object-oriented application 220. However, during actual execution and deployment of an object-oriented application 220, the behavior of the object-oriented application 220 itself may vary between users. Accordingly, it may be beneficial to further tune or update the logging levels 240 for various execution paths based on the usage of the object-oriented application 220 by a user.

Accordingly, in some embodiments, a monitoring module 206 may monitor execution of the object-oriented application 220 in order to gather data describing activity of the object-oriented application 220 during execution, shown as activity 250. In some embodiments, the data describing activity 250 of the object-oriented application 220 may be defined with respect to a particular time window (e.g., one day, one week). Such information may describe, for example, when particular branches of the tree structure 230 (e.g., particular execution paths of the object-oriented application 220) are taken during execution. In some embodiments, each execution of a particular branch may cause the weight associated with that branch to be modified (e.g., increased) by the monitoring module 206. Thus, more frequently taken branches may be assigned a higher weight.

For example, in some embodiments, activity 250 of the object-oriented application 220 during execution may be monitored by the monitoring module 206 such that each instance (e.g., cycle) that a particular execution path corresponding to a particular branch of the tree structure 230 is taken by the object-oriented application 220 is recorded (e.g., in a table or other data structure). Each entry may indicate, for example, the weight to which the branch was updated at that particular cycle. Each entry may also indicate a time at which the particular branch was taken and the table or data structure updated (e.g., a time record). This information may then be provided to the assignment module 204 such that the logging levels 240 for each branch may be updated. Put differently, the updated weights and/or recorded time records may be used by the assignment module 204 to update the logging levels 240 for the different branches of the object-oriented application 220.

As an example, in some embodiments, a prediction module 208 may generate a time-series model 260 based on the recorded updated weights and/or recorded time records to determine, for each branch, predicted weights and time records. These predicted weights and time records may then be used by the assignment module 204 for each branch to determine their updated logging level 240. As an example, an indicator value may be calculated for each branch. An indicator value is a score or quantitative evaluation for that branch based on information such as predicted and/or recorded weights and/or time records for that branch. The indicator value may be calculated according to a variety of approaches based on particular design considerations.

As an example, an indicator value in the future after N cycles may be defined as:

$$I_{branch-future} = \frac{\sum_{n=0}^{N} Wn * U_{branch-n}}{\sum_{n=0}^{N} U_{branch-n}}$$

where $W_n$ is the weight at future cycle n and $U_{branch-n}$ is the updated time at future cycle n.

The indicator value for each branch may then be used by the assignment module 204 to determine a logging level 240 for that branch. Where the determined logging level 240 for a particular branch is different than the previously assigned logging level 240, the logging level 240 may be updated for that branch. In some embodiments, each logging level 240 may correspond to a particular range of indicator values. A branch having an indicator value falling within a particular range will then have its logging level 240 assigned to the corresponding logging level 240 for that range.

In some embodiments, the indicator value may be modified (e.g., increased or decreased) based on other information associated with execution of the object-oriented application 220 as indicated in the activity 250 monitored by the monitoring module 206. Such information may include, for example, a degree to which exceptions are thrown for a particular branch. For example, when a given method throws an exception during execution, information indicating the exception was thrown may be stored by the monitoring module 206 in association with the branches for that method. Continuing with the example A-M1 above, should an error be thrown, information indicating that an error was thrown may be stored in association with branches linking class A to classes C and B, or to branches linking class A to attributes C-a1 and B-a1, depending on the particular encoding schema used. The indicator values for those branches may be modified based on their associated degrees to which exceptions were thrown. For example, indicator values may be scaled or weighted, or be modified where degrees to which exceptions were thrown exceeds a threshold. This allows branches that may be less frequently taken but have higher degrees of exceptions to be assigned a higher logging level 240. Conversely, more frequently taken branches with low degrees of exception may be assigned a lower logging level 240.

In some embodiments, one or more filtering operations may be applied by the assignment module 204 to the branches before updating their respective logging levels 240. The one or more filtering operations serve to subdivide the branches into multiple groups. As an example, in some embodiments, applying the one or more filtering operations may include clustering the branches based on their respective weights and/or time records. As another example, in some embodiments, applying the one or more filtering operations may include selecting, as a filter group, those branches having an aggregate (e.g., average or other aggregate value) time records and/or weight below a predefined threshold. One or more of the groups defined by the filtering operation may then have a default logging level 240 assigned or be excluded by the prediction module 208 from generating the time-series model 260 described above, thereby improving overall performance.

Figure 3:
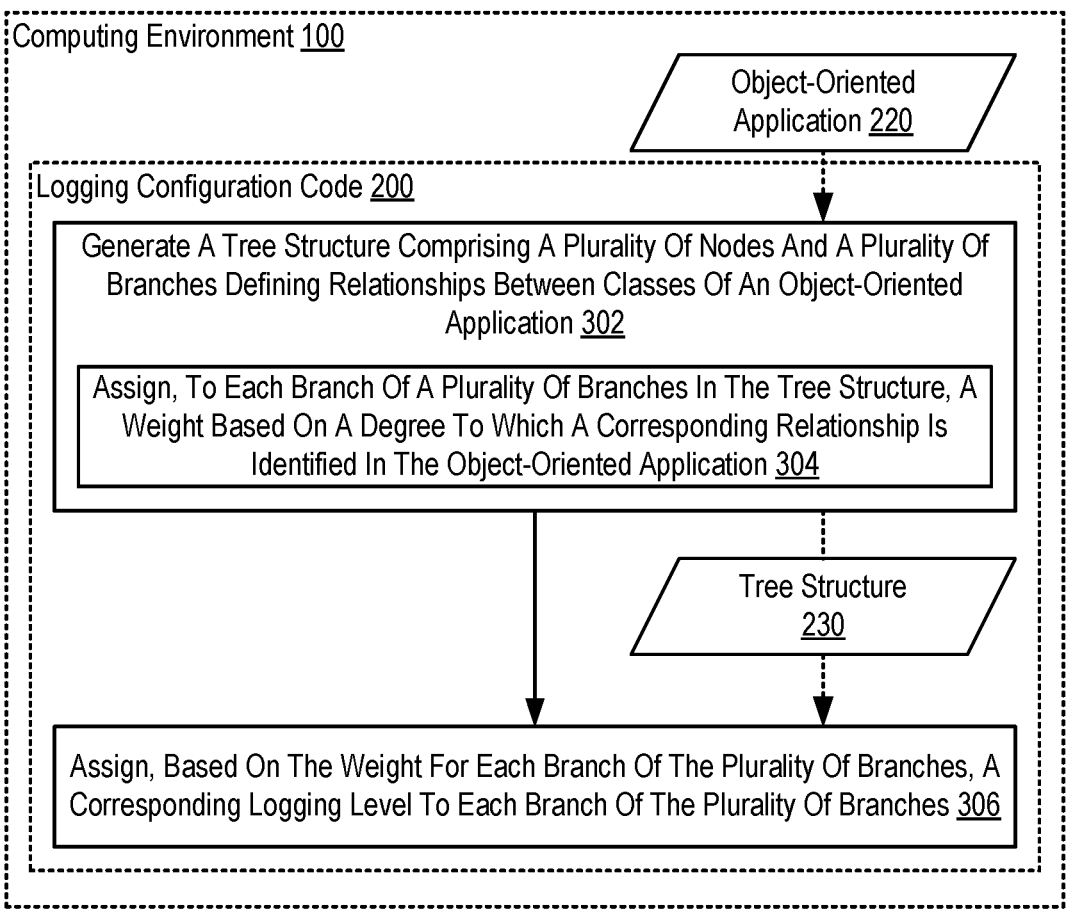
FIG. 3 shows a flowchart of a example method for controlling application logging according to some embodiments of the present disclosure.

For further explanation, FIG. 3 shows a flowchart of an example method for controlling application logging according to some embodiments of the present disclosure. The method of FIG. 3 may be performed, for example, by logging configuration code 200 executed in a computing environment 100 as described above. The logging configuration code 200 may be executed in the computing environment 100 and accept, as input, an object-oriented application 200. The method of FIG. 3 includes generating 302 a tree structure 230 comprising a plurality of nodes and a plurality of branches defining relationships between classes of an object-oriented application 220. Generating 302 the tree structure 230 may be performed by the parsing module 202 described above. In some embodiments, generating 302 the tree structure 230 comprises parsing a representation of the object-oriented application 220. Such a representation may include a non-executable representation of the object-oriented application 220, such as source code of the object-oriented application 220.

The tree structure 230 may include multiple nodes. In some embodiments, one or more of the nodes may correspond to a class of the object-oriented application 220. In some embodiments, one or more of the nodes may correspond to a particular attribute of a particular class of the object-oriented application 220. By parsing the object-oriented application 220 to generate the tree structure 230, a branch (e.g., a link between nodes) may be created in the tree structure based on a method of a particular class including a method that accepts, as a parameter, an attribute of a particular class (e.g., of the same particular class, of a different class).

Generating 302 the tree structure may include assigning weights to each branch to be used in assigning their respective logging levels 240. Accordingly, in some embodiments, generating 302 the tree structure includes assigning 304, to each branch of a plurality of branches in the tree structure 230, a weight based on a degree to which a corresponding relationship is identified in the object-oriented application 220. While parsing the object-oriented application 220, a given branch may be identified multiple times by virtue of being represented by multiple different methods. Accordingly, a first instance of a branch being identified may cause data encoding that branch to be stored with some initial weight. As subsequent instances of that branch are identified, the weight for that branch may be updated (e.g., increased).

The method of FIG. 3 also includes assigning 306, based on the weight for each branch of the plurality of branches, a corresponding logging level 240 to each branch of the plurality of branches. Assigning 306 a corresponding logging level 240 to each branch of the plurality of branches may be performed by the assignment module 204 of FIG. 2. A logging level 240 defines an amount of detail or information to be included in a log message generated in response to an execution path performed along that branch. For example, for the lowest logging level 240, an error may only cause log data to be generated indicating that some error occurred. The next-highest logging level 240 may cause log data to be generated specifying the type of error that occurred and/or an indication of where, in the code, such an error occurred. The highest logging level 240 may cause log data to be generated with additional detail, such as stack traces, runtime information, and the like. In some embodiments, particular logging levels 240 may print information related to particular classes, such as method attribute keywords and the like. In some embodiments, each logging level 240 may correspond to a particular weight range. A branch having a weight falling within that range may then be assigned the corresponding logging level 240.

In some embodiments, the logging levels 240 for the various branches of the object-oriented application 220 may be encoded in a configuration file or other data accessed during execution of the object-oriented application 220 such that log data may be generated according to these logging levels 240 during execution. In some embodiments, the logging levels 240 for the various branches of the object-oriented application 220 may be encoded in the source code of the object-oriented application 220 itself such that, once compiled, the object-oriented application 220 will be generated according to these logging levels 240.

Figure 4:
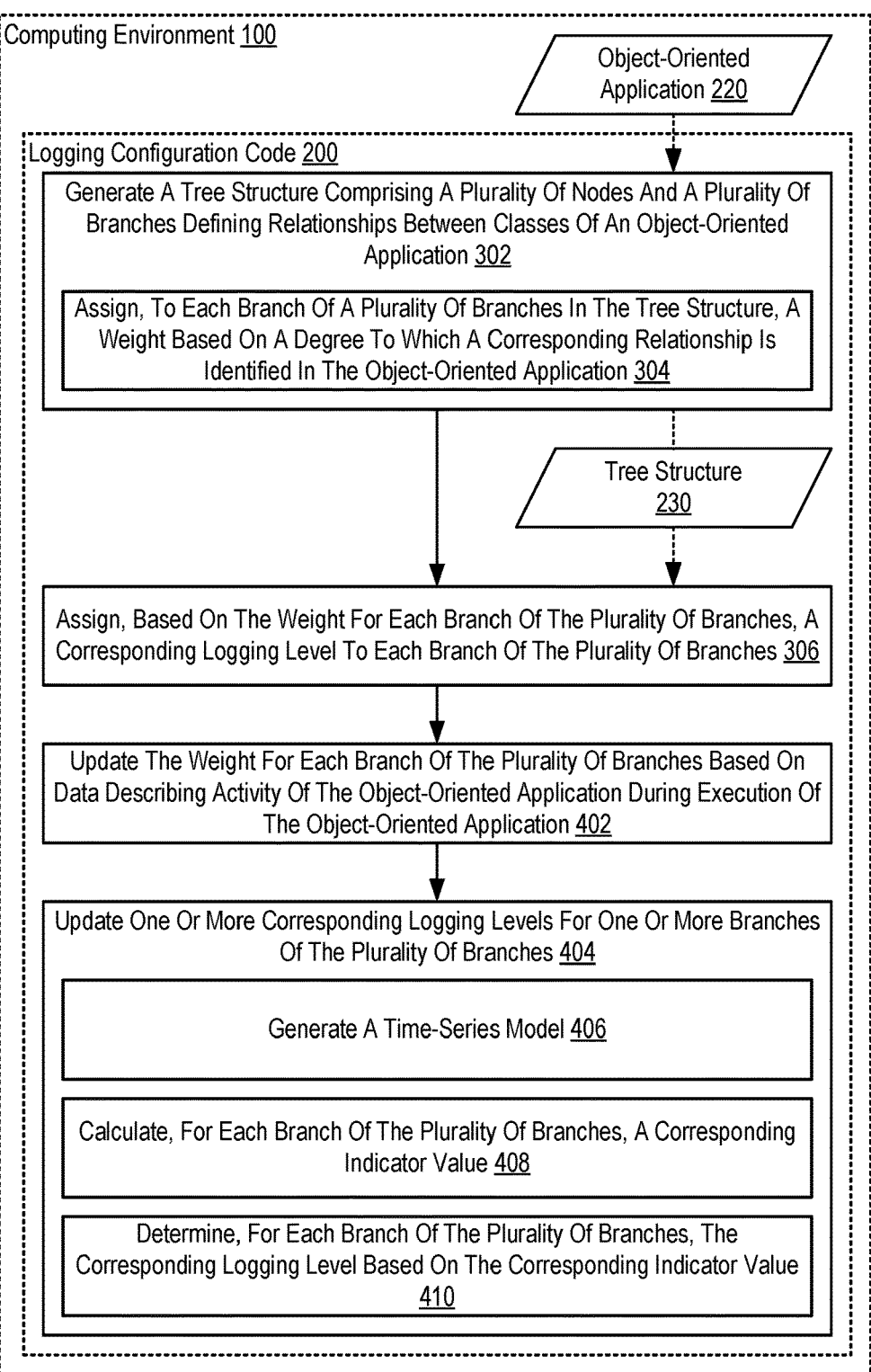
FIG. 4 shows a flowchart of another example method for controlling application logging according to some embodiments of the present disclosure.

For further explanation, FIG. 4 sets forth a flowchart of an example method of controlling application logging in accordance with some embodiments of the present disclosure. The method of FIG. 4 is similar to FIG. 3 in that the method of FIG. 4 also includes: generating 302 a tree structure 230 comprising a plurality of nodes and a plurality of branches defining relationships between classes of an object-oriented application, including assigning 304, to each branch of a plurality of branches in the tree structure 230, a weight based on a degree to which a corresponding relationship is identified in the object-oriented application 220; and assigning 306, based on the weight for each branch of the plurality of branches, a corresponding logging level to each branch of the plurality of branches.

The method of FIG. 4 differs from FIG. 3 in that the method of FIG. 4 also includes updating 402 the weight for each branch of the plurality of branches based on data describing activity of the object-oriented application 220 during execution of the object-oriented application 220. Updating 204 the weight for each branch of the plurality of branches based on data describing activity of the object-oriented application 220 during execution of the object-oriented application may be performed by the monitoring module 206 of FIG. 2. The data describing activity of the object-oriented application 220 during execution of the object-oriented application 220 may include a table or data structure indicating when a particular branch is taken during execution of the object-oriented application 220. For example, execution of the object-oriented application 220 may be monitored over a particular time window to identify when a particular branch is taken during execution of the object-oriented application 220. The weight for each branch may be updated (e.g., increased) when taken such that more frequently taken branches are assigned higher weights. Each entry of the table or data structure may correspond to a particular instance when a branch was taken. Each entry may also indicate the corresponding updated weight for that branch due to the branch being taken at that instance. As will be described in further detail below, the table or data structure may also include a time indicating when the branch was taken (e.g., a time record).

The method of FIG. 3 also includes updating 404 one or more corresponding logging levels for one or more branches of the plurality of branches. Updating 404 the one or more corresponding levels may be performed at least by the assignment module 204. In some embodiments, an indicator value may be calculated for each branch based on various data points, as will be described in further detail below, from which the logging levels for each branch may be determined. In some embodiments, such indicator values may be based on a predictive analysis of each branch, including a predictive analysis of the weights for each branch. Accordingly, in some embodiments, updating 404 one or more corresponding logging levels for one or more branches of the plurality of branches may include generating 406 a time-series model 260. Generating 406 the time-series model 260 may be performed by the prediction module 208 of FIG. 2.

The time-series model 260 may include a time-series prediction for each branch, including a time-series prediction for weights for that branch. For example, using the data describing activity of the object-oriented application 220 described above, a time-series model 260 for the weights for each branch may be generated. The time-series model 260 may be generated with respect to a particular number of cycles (e.g., a particular number of instances of executing that branch) in the future such that at N cycles in the future a corresponding weight for that branch may be predicted. As will be described in further detail below, the time-series model 260 may also include predicted time records for some number of cycles in the future.

In some embodiments, updating 404 the one or more corresponding logging levels for one or more branches of the plurality of branches may also include calculating 408, for each branch of the plurality of branches, a corresponding indicator value. An indicator value is a score or quantitative evaluation for that branch based on information such as predicted and/or recorded weights and/or time records for that branch as indicated in the time-series model 260. The indicator value may be calculated according to a variety of approaches based on particular design considerations.

As an example an indicator value (i.e., $I_{branch-future}$) in the future after N cycles may be defined as:

$$I_{branch-future} = \frac{\sum_{n=0}^{N} Wn * U_{branch-n}}{\sum_{n=0}^{N} U_{branch-n}}$$

Where $W_n$ is the weight at future cycle n and $U_{branch-n}$ is the updated time at future cycle n.

The indicator values for each branch may then be used to update one or more of the logging levels 240 for the branches of the object-oriented application 240. Accordingly, in some embodiments, updating 404 the one or more corresponding logging levels for one or more branches of the plurality of branches may also include determining 410 (e.g., by the assignment module 204), for each branch of the plurality of branches, the corresponding logging level 240 based on the corresponding indicator value. Where the determined 410 logging level 240 for a particular branch differs from the currently assigned logging level, the logging level 240 for that particular branch is then updated to reflect the determined 410 logging level 240. As an example, each logging level 240 may correspond to a particular range of indicator values. A logging level 240 for a particular branch may be determined 410 as corresponding to the range of indicator values into which the indicator value of the particular branch falls.

For further explanation, FIG. 5 sets forth a flowchart of an example method of controlling application logging in accordance with some embodiments of the present disclosure. The method of FIG. 5 is similar to FIG. 4 in that the method of FIG. 5 also includes: generating 302 a tree structure 230 comprising a plurality of nodes and a plurality of branches defining relationships between classes of an object-oriented application 220, including assigning 304, to each branch of a plurality of branches in the tree structure 230, a weight based on a degree to which a corresponding relationship is identified in the object-oriented application 220; assigning 306, based on the weight for each branch of the plurality of branches, a corresponding logging level 240 to each branch of the plurality of branches; updating 402 the weight for each branch of the plurality of branches based on data describing activity of the object-oriented application 220 during execution of the object-oriented application 220; and updating 404 one or more corresponding logging levels for one or more branches of the plurality of branches, including: generating 406 a time-series model; calculating 408, for each branch of the plurality of branches, a corresponding indicator value; and determining 410, for each branch of the plurality of branches, the corresponding logging level 240 based on the corresponding indicator value.

The method of FIG. 5 differs from FIG. 4 in that the method of FIG. 5 also includes calculating 502, for each branch of the plurality of branches and based on the data describing activity of the object-oriented application 220 during execution of the object-oriented application 220, one or more time records. Calculating 502 the one or more time records may be performed by the monitoring module 206. A time record indicates when a particular branch of the object-oriented application 220 was taken. Accordingly, each time a particular branch of the object-oriented application 220 is taken, an entry in the data describing activity of the object-oriented application 220 may be created that indicates when that branch was taken. In other words, where the data describing activity of the object-oriented application 220 includes multiple entries describe multiple instances where a given branch was encountered, each entry may include a corresponding time record indicating when that particular instance occurred.

The time records for a given branch may then be used in updating 404 the corresponding logging levels for the one or more branches of the plurality of branches. For example, the time series model may be generated 406 to include predicted time records for each branch indicating predicted times at which the corresponding branch will be executed. These predicted time records may then be used in 408 calculating the indicator values for each branch, which may subsequently be used in determining 410 the corresponding logging levels 240 for each branch.

For further explanation, FIG. 6 sets forth a flowchart of an example method of controlling application logging in accordance with some embodiments of the present disclosure. The method of FIG. 6 is similar to FIG. 4 in that the method of FIG. 6 also includes: generating 302 a tree structure 230 comprising a plurality of nodes and a plurality of branches defining relationships between classes of an object-oriented application, including assigning 304, to each branch of a plurality of branches in the tree structure 230, a weight based on a degree to which a corresponding relationship is identified in the object-oriented application 220; assigning 306, based on the weight for each branch of the plurality of branches, a corresponding logging level to each branch of the plurality of branches; updating 402 the weight for each branch of the plurality of branches based on data describing activity of the object-oriented application 220 during execution of the object-oriented application 220; and updating 404 one or more corresponding logging levels for one or more branches of the plurality of branches, including: generating 406 a time-series model; calculating 408, for each branch of the plurality of branches, a corresponding indicator value; and determining 410, for each branch of the plurality of branches, the corresponding logging level based on the corresponding indicator value.

The method of FIG. 6 differs from FIG. 4 in that the method of FIG. 6 also includes determining 602, for each branch of the plurality of branches, a degree of thrown exceptions. Determining 602 the degree of thrown exceptions may be performed by the monitoring module 206 of FIG. 2. For a given branch, a degree of thrown exceptions may include a number of times a branch resulted in an exception within a particular time window, a frequency at which exceptions are thrown within a particular time window, or some other value reflecting a degree to which a particular branch results in an exception being thrown. For example, when a given method throws an exception during execution, information indicating the exception was thrown may be stored in association with the branches for that method. Continuing with the example A-M1 above, should an error be thrown, information indicating that an error was thrown may be stored in association with branches linking class A to classes C and B, or to branches linking class A to attributes C-a1 and B-a1, depending on the particular encoding schema used. The indicator values for those branches may be modified based on their associated degrees to which exceptions were thrown. For example, indicator values may be scaled or weighted, or be modified where degrees to which exceptions were thrown exceeds a threshold. This allows branches that may be less frequently taken but have higher degrees of exceptions to be assigned a higher logging level 240. Conversely, more frequently taken branches with low degrees of exception may be assigned a lower logging level 240.

Figure 7:
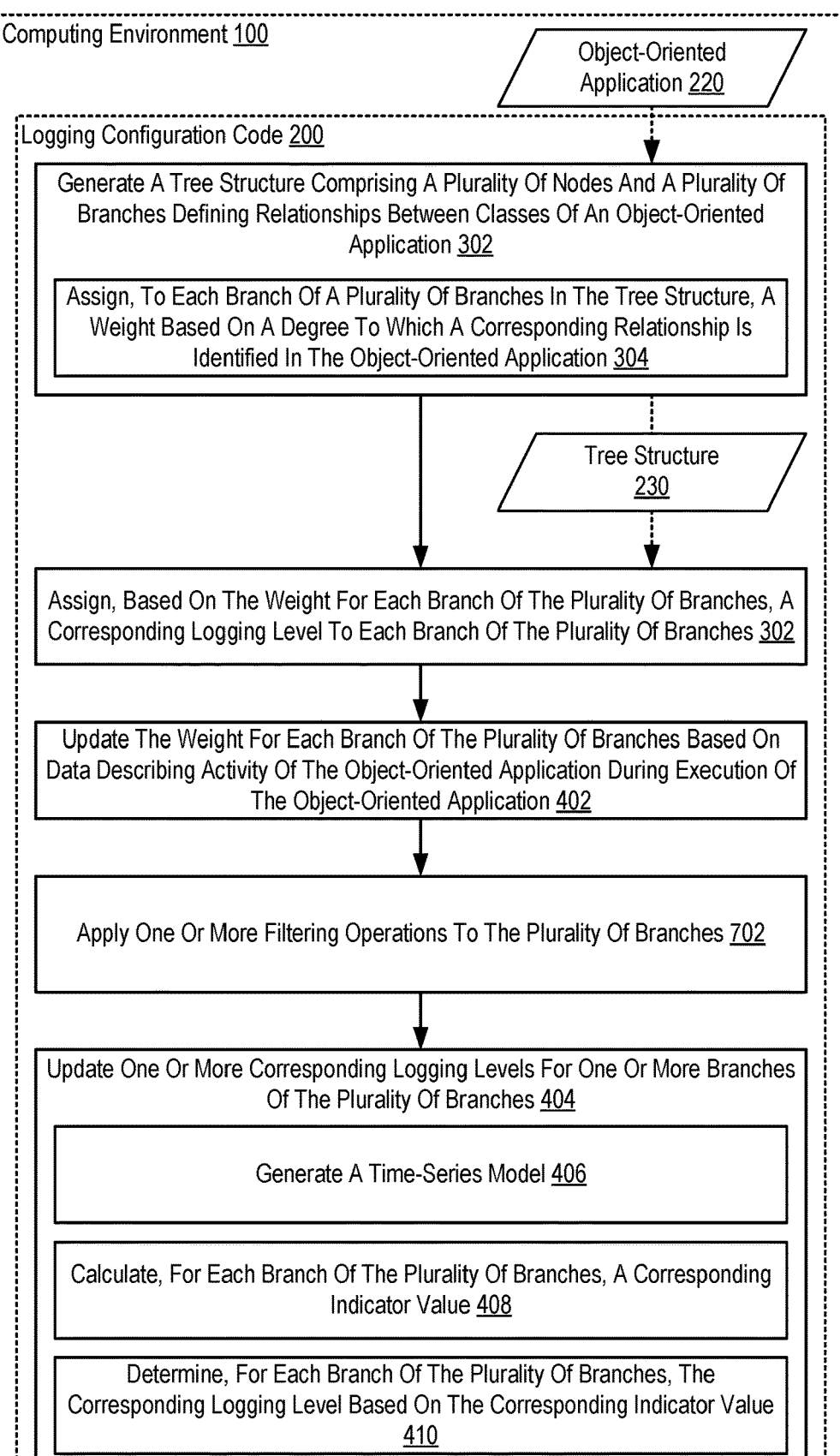
FIG. 7 shows a flowchart of another example method for controlling application logging according to some embodiments of the present disclosure.

For further explanation, FIG. 7 sets forth a flowchart of an example method of controlling application logging in accordance with some embodiments of the present disclosure. The method of FIG. 7 is similar to FIG. 4 in that the method of FIG. 7 also includes: generating 302 a tree structure 230 comprising a plurality of nodes and a plurality of branches defining relationships between classes of an object-oriented application, including assigning 304, to each branch of a plurality of branches in the tree structure 230, a weight based on a degree to which a corresponding relationship is identified in the object-oriented application 220; assigning 306, based on the weight for each branch of the plurality of branches, a corresponding logging level 240 to each branch of the plurality of branches; updating 402 the weight for each branch of the plurality of branches based on data describing activity of the object-oriented application 220 during execution of the object-oriented application 220; and updating 404 one or more corresponding logging levels 240 for one or more branches of the plurality of branches, including: generating 406 a time-series model; calculating 408, for each branch of the plurality of branches, a corresponding indicator value; and determining 410, for each branch of the plurality of branches, the corresponding logging level 240 based on the corresponding indicator value.

The method of FIG. 7 differs from FIG. 4 in that the method of FIG. 7 also includes applying 702 one or more filtering operations to the plurality of branches. Applying 702 the one or more filtering operations may be performed by the assignment module 204. The one or more filtering operations serve to subdivide the branches into multiple groups. As an example, in some embodiments, applying 702 the one or more filtering operations may include clustering the branches based on their respective weights and/or time records. As another example, in some embodiments, applying 702 the one or more filtering operations may include selecting, as a filter group, those branches having an aggregate (e.g., average or other aggregate value) time record and/or weight below a predefined threshold. One or more of the groups defined by the filtering operation may then have a default logging level assigned or be excluded from generating the time-series model 260 described above, thereby improving overall performance.

In view of the explanations set forth above, readers will recognize that the benefits of controlling application logging according to embodiments of the present invention include improved performance of a computing system by allowing for dynamically determined and variable logging levels for different execution paths in an object-oriented application.

Exemplary embodiments of the present invention are described largely in the context of a fully functional computer system for controlling application logging. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for controlling application logging, the computer-implemented method comprising:

identifying, by a processor, one or more relationships between a plurality of classes of an object-oriented application;

parsing the object-oriented application, by the processor, to generate a tree structure comprised of a plurality of nodes and a plurality of branches, wherein each of the plurality of branches is comprised of at least one node from the plurality of nodes, based on the identified one or more relationships, wherein one or more nodes of the plurality of nodes correspond to one or more classes of the object-oriented application;

assigning, by the processor, a weight to each of the plurality of branches, based at least in part on an identified relationship corresponding to each of the one or more nodes comprising each of the plurality of branches;

executing, by the processor, the object-oriented application;

determining, by the processor and based on executing the object-oriented application, a logging level for each branch of the plurality of branches, based on the assigned weight for each branch of the plurality of branches, wherein a logging level for a branch defines an amount of information to be included in a log message generated based on an execution path performed along the branch; and dynamically generating, by the processor and based on the logging level determined for each branch, log data for each branch of the plurality of branches to control the application logging, wherein dynamically generating the log data includes:

generating first log data for a first branch, of the plurality of branches, based on a first logging level assigned to the first branch, wherein the first branch is assigned the first logging level based on the first branch having a first execution path with a first degree of occurrence, and generating second log data for a second branch, of the plurality of branches, based on a second logging level assigned to the second branch, wherein the second branch is assigned the second logging level based on the second branch having a second execution path with a second degree of occurrence that exceeds the first degree of occurrence.

2. The computer-implemented method of claim 1, wherein the one or more nodes are first one or more nodes, and wherein second one or more nodes of the plurality of nodes correspond to one or more attributes of the one or more classes of the object-oriented application.

3. The computer-implemented method of claim 1, further comprising:

monitoring, by the processor, execution of the object-oriented application;

updating, based on the monitoring, the weight for each branch of the plurality of branches; and updating, by the processor, based on one or more updated weights, one or more corresponding logging levels for one or more branches of the plurality of branches.

4. The computer-implemented method of claim 3, further comprising generating, by the processor, one or more time records for each branch of the plurality of branches based on the monitoring.

5. The computer-implemented method of claim 3, wherein updating the one or more corresponding logging levels further comprises generating, by the processor, a time-series model comprising one or more predictive weights for each branch of the plurality of branches.

6. The computer-implemented method of claim 5, wherein the time-series model comprises one or more predictive time records for each branch of the plurality of branches.

7. The method of claim 5, wherein updating the one or more corresponding logging levels further comprises:

calculating, by the processor, a corresponding indicator value for each branch of the plurality of branches; and determining, by the processor, the corresponding logging level for each branch of the plurality of branches based on the corresponding indicator value.

8. The method of claim 3, further comprising determining, by the processor, for each branch of the plurality of branches, a degree of thrown exceptions, wherein updating the one or more corresponding logging levels is further based on the degree of thrown exceptions for the one or more branches.

9. The method of claim 3, further comprising applying, by the processor, one or more filtering operations to the plurality of branches.

10. A computer system for controlling application logging, the computer system comprising:

one or more processors;

a memory storage device in communication with the one or more processors, and computer program instructions executable by the one or more processors to perform operations, the operations comprising:

identifying, by the one or more processors, one or more relationships between a plurality of classes of an object-oriented application;

parsing the object-oriented application, by the one or more processors, to generate a tree structure comprised of a plurality of nodes and a plurality of branches, wherein each of the plurality of branches is comprised of at least one node from the plurality of nodes, based on the identified one or more relationships, wherein one or more nodes of the plurality of nodes correspond to one or more classes of the object-oriented application;

assigning, by the one or more processors, a weight to each of the plurality of branches, based at least in part on an identified relationship corresponding to each of the one or more nodes comprising each of the plurality of branches;

executing, by the one or more processors, the object-oriented application;

dynamically determining, by the one or more processors, a logging level for each branch of the plurality of branches, based on executing the object-oriented application and based on the assigned weight for each branch of the plurality of branches, wherein a logging level for a branch defines an amount of information to be included in a log message generated based on an execution path performed along the branch; and dynamically generating, by the one or more processor, log data for each branch of the plurality of branches to control the application logging based on dynamically determining the logging level to each branch of the plurality of branches, wherein dynamically generating the log data includes:

generating first log data for a first branch, of the plurality of branches, based on a first logging level assigned to the first branch, wherein generating the first log data comprises generating a first amount of information based on the first logging level, and generating second log data for a second branch, of the plurality of branches, based on a second logging level assigned to the second branch, wherein generating the second log data comprises generating a second amount of information based on the second logging level, and wherein the second amount of information is different than the first amount of information based on the second logging level being different than the first logging level.

11. The computer system of claim 10, wherein the one or more nodes are first one or more nodes, and wherein second one or more nodes of the plurality of nodes correspond to one or more attributes of the one or more classes of the object-oriented application.

12. The computer system of claim 10, wherein the operations further comprise:

monitoring, by the one or more processors, execution of the object-oriented application;

updating, by the one or more processors, based on the monitoring, the weight for each branch of the plurality of branches; and updating, by the one or more processors, based on one or more updated weights, one or more corresponding logging levels for one or more branches of the plurality of branches.

13. The computer system of claim 12, wherein the operations further comprise generating, by the one or more processors, one or more time records for each branch of the plurality of branches based on the monitoring.

14. The computer system of claim 12, wherein updating the one or more corresponding logging levels comprises generating, by the one or more processors, a time-series model comprising one or more predictive weights for each branch of the plurality of branches.

15. The computer system of claim 14, wherein the time-series model further comprises one or more predictive time records for each branch of the plurality of branches.

16. The computer system of claim 15, wherein updating the one or more corresponding logging levels comprises:

calculating, by the one or more processors, a corresponding indicator value for each branch of the plurality of branches; and determining, by the one or more processors, the corresponding logging level for each branch of the plurality of branches, based on the corresponding indicator value.

17. The computer system of claim 12, wherein the operations further comprise determining, by the one or more processors, for each branch of the plurality of branches, a degree of thrown exceptions, wherein updating the one or more corresponding logging levels is further based on the degree of thrown exceptions for the one or more branches.

18. The computer system of claim 12, wherein the operations further comprise applying, by the one or more processors, one or more filtering operations to the plurality of branches.

19. A computer program product for controlling application logging, the computer program product comprising a computer readable storage device, program instructions stored on the computer readable storage device, the program instructions executable by a processor to cause the processor to perform a function, the function comprising:

identifying, by the processor, one or more relationships between a plurality of classes of an object-oriented application;

generating, by the processor, a tree structure comprised of a plurality of nodes and a plurality of branches, wherein each of the plurality of branches is comprised of at least one node from the plurality of nodes, based on the identified one or more relationships, wherein one or more nodes of the plurality of nodes correspond to one or more classes of the object-oriented application;

assigning, by the processor, a weight to each of the plurality of branches, based at least in part on an identified relationship corresponding to each of the one or more nodes comprising each of the plurality of branches;

executing, by the processor, the object-oriented application;

dynamically determining, by the processor, a logging level for each branch of the plurality of branches, based on the object-oriented application and based on the assigned weight for each branch of the plurality of branches; and dynamically generating, by the processor, log data for each branch of the plurality of branches to control the application logging based on dynamically determining the logging level to each branch of the plurality of branches, wherein dynamically generating the log data includes:

generating first log data for a first branch, of the plurality of branches, based on a first logging level assigned to the first branch, wherein the first branch is assigned the first logging level based on the first branch having a first execution path with a first degree of occurrence, and generating second log data for a second branch, of the plurality of branches, based on a second logging level assigned to the second branch, wherein the second branch is assigned the second logging level based on the second branch having a second execution path with a second degree of occurrence that is different than the first degree of occurrence.

20. The computer program product of claim 19, wherein the one or more nodes are first one or more nodes, and wherein second one or more nodes of the plurality of nodes correspond to one or more attributes of the one or more classes of the object-oriented application.

* * * * *